United States Patent [19]

Müller et al.

[11] 4,018,420
[45] Apr. 19, 1977

[54] SLIDE VALVE FOR CLOSING A LARGE PRESSURIZED GAS CONVEYING PIPE

[75] Inventors: Rudolf Müller, Merzenich; Hermann Josef Stolberg, Duren, both of Germany

[73] Assignee: Hermann Rappold & Co. GmbH, Duren, Germany

[22] Filed: Dec. 5, 1975

[21] Appl. No.: 638,094

[30] Foreign Application Priority Data

Dec. 5, 1974 Germany .......................... 2457428

[52] U.S. Cl. .............................. 251/172; 251/202; 251/327; 251/328; 138/94.3
[51] Int. Cl.² .......................................... F16K 3/20
[58] Field of Search .......... 251/326, 327, 328, 329, 251/172, 175, 174, 202; 138/94.3

[56] References Cited
UNITED STATES PATENTS

| | | | |
|---|---|---|---|
| 1,868,147 | 7/1932 | Kruse | 251/172 |
| 2,109,042 | 2/1938 | Bennett et al. | 251/172 X |
| 3,145,969 | 8/1964 | Zweck | 251/172 |
| 3,557,822 | 1/1971 | Chronistel | 251/328 X |
| 3,559,948 | 2/1971 | Grove | 251/174 |
| 3,665,953 | 5/1972 | Chronistel | 251/327 |
| 3,817,287 | 6/1974 | Aitken | 251/328 |

Primary Examiner—William R. Cline
Attorney, Agent, or Firm—Wenderoth, Lind & Ponack

[57] ABSTRACT

A housing, connectable to a pipe, has therein an opening, a chamber, a stationary sealing seat, and a movable sealing seat displaceable toward and away from the stationary sealing seat. A slide plate is movable from an open position, exterior of the housing, through the opening to a closed position between the sealing seats to block the pipe. A closing element closes the opening and seals the chamber when the slide plate is in the open position.

7 Claims, 4 Drawing Figures

SLIDE VALVE FOR CLOSING A LARGE PRESSURIZED GAS CONVEYING PIPE

BACKGROUND OF THE INVENTION

The present invention relates to a slide valve for closing large gas pipes, in particular such pipes carrying dust-containing hot gases, of the type including a slide plate that can be displaced transverse to the gas pipe through a housing opening, between an open position outside the slide housing and a closed position inside the slide housing, which housing opening can be closed by a closing element.

A shutoff slide val ve of this type is known from German DT-AS No. 2,136,216. However, the slide structure suggested therein possesses only a single sealing arrangement and consequently it is suitable only for closing pressurized gas pipes. On the other hand, in the case of pressurized pipes, e.g. the pipes of blast furnaces operating by counterpressure principle, the above known shutoff slide valve would begin to leak after a short time and its sealing surfaces would then be destroyed by the sand-blast type effect of the dust-containing gas, which under certain circumstances flows out with the velocity of sound.

In order to close pressurized gas pipes of this type, e.g. the so-called gravity-feed pipes between the blast furnace and the dust collector of a blast furnace installation, fully encapsuled insertion-disk slide valves are thus used, which slide valves include a housing, a fixed sealing seat in the housing and a movable sealing seat in the housing. Such valves guarantee a perfect tightness, even in counterpressure operation, due to the fact that the slide plate is completely encapsuled and the sealing seats of the housing can also be pressed against the sealing rings of the slide plate.

However, encapsuled insertion-disk slide valves are associated with the disadvantages of very high weight, high cost and, finally, the entire displacement of the slide plate takes place in the interior of the housing, i.e. the slide plate cannot be seen from the outside. Dust and moisture in the interior of the housing necessarily lead to the formation of deposits. The replacement of packings or of entire sealing rings comprising the packings is a difficult and time consuming operation, since large openings must be freed on the housing hood or the entire hood must be removed laterally. This also requires extensive crane equipment.

SUMMARY OF THE INVENTION

The object of the present invention is to provide a shutoff slide valve of the above type, with which it is possible to dispense with a hood for receiving the slide plate in the open position, yet which is suitable for employment in pressurized gas pipes, e.g. the gravity-feed pipe of a blast furnace working on the counterpressure principle, and which guarantees a perfect tightness, even under such conditions, both with respect to the atmosphere when in the open position, and also with respect to the pipe section to be closed when in the closed position.

The object is achieved in accordance with the present invention in that the slide valve is provided in known manner with a stationary sealing seat and a movable sealing seat displaceable in the axial direction of the gas pipe, which movable sealing seat can be pressed against the stationary sealing seat or against a slide plate when inserted between the sealing seats. The sealing seats are joined to the slide housing through a firm or a flexible connection; so that a housing chamber is formed in the slide housing, which chamber can be separated in a gas tight manner from the interior of the gas pipe and which can be made to communicate with the atmosphere through a housing opening.

In the open position of the slide valve the two sealing seats are pressed directly against each other, while the housing opening and therewith the housing chamber are closed by a closing element. Should gas perhaps leak through the two sealing seats, a counter pressure will be built up in the housing chamber opposite to the pressure in the pipe, the counter pressure additionally acting on the closing element in the sealing direction thereof. This secures a perfect seal of the slide valve in relation to the atmosphere.

In the closed position of the slide valve the two sealing seats are pressed against the slide plate, which provides a double seal of the slide. The closing element remains open in this position, which, in the event of any possible slight leakage between the slide plate and the pressure side sealing seat, prevents the buildup of an overpressure in the housing chamber opposite the pipe section to be closed, thereby securing a perfect seal of the slide valve in relation to the pressureless gas pipe section to be closed.

In a further feature of the invention, the slide housing is provided with a suction connection, through which the housing chamber can be vented, thereby making it possible to draw off by means of a ventilator any gas which may possibly flow into the housing chamber when the slide is closed.

According to another feature of the invention, the housing is provided with an inlet connection, through which the housing chamber can be subjected to the action of an inert gas, e.g. $N_2$, in the open position of the slide. In this manner it is possible to bring about or assist the formation of a counterpressure in the housing chamber.

Further, it is provided according to the invention that the closing element in the slide housing be formed of a closing plate, preferably displaceable by means of hydraulic cylinders, which plate is guided by rollers that run in track rails extending axially parallel with the gas pipes. The closing plate has wedge surfaces that engage complementary wedge surfaces stationarily arranged on the slide housing, so that in the closed position the closing plate can be pressed, through the effect of the wedges, against housing sealing surfaces of the slide housing.

Further, the invention provides that the slide plate be operated by a rack or sprocket wheel drive situated outside the sliding housing.

These features simplify gas tight closing of the housing chamber in the open position of the slide.

BRIEF DESCRIPTION OF THE DRAWINGS

An exemplified embodiment of the invention is described in more detail in the following description, taken with the accompanying drawings, wherein.

DETAILED DESCRIPTION OF THE INVENTION

Figure 1:
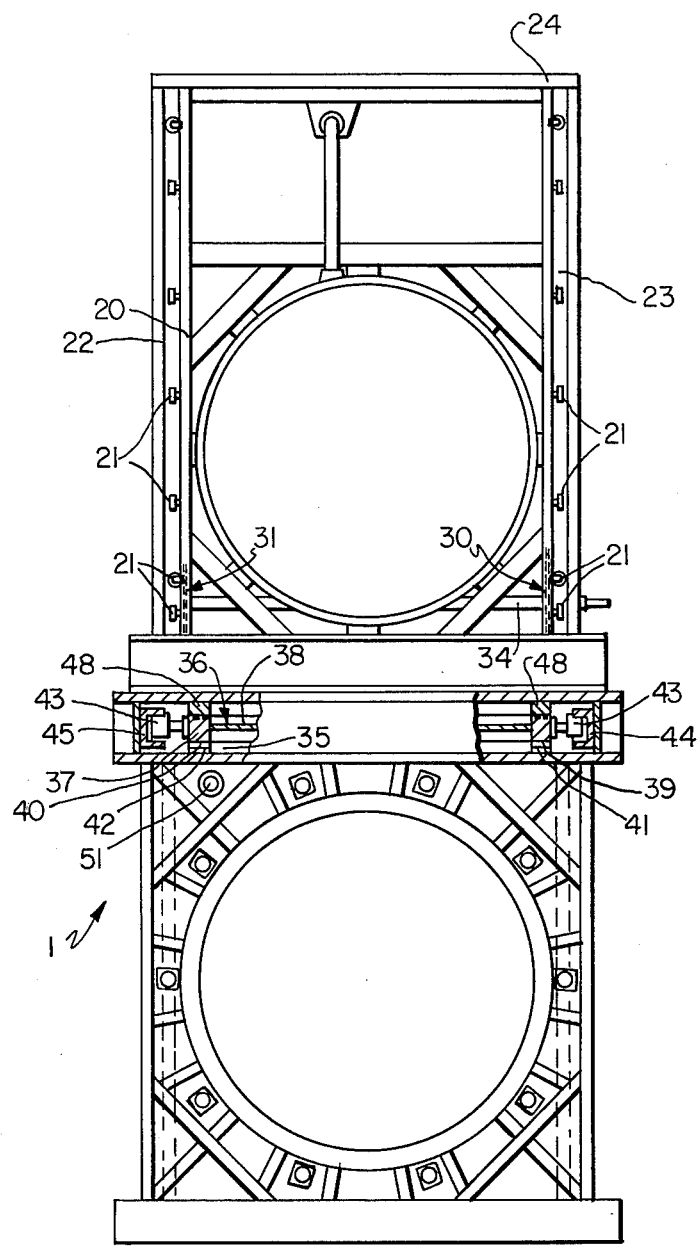
FIG. 1 is a frontal elevation view of a shutoff slide valve in accordance with the invention.

The shutoff slide valve shown in FIGS. 1 to 4 includes a slide housing 1 having flanges 2 and 3, through which the slide can be attached to gas pipe sections 4 and 5, respectively. Slide housing 1 preferably is a welded structure made of iron sections and sheet-metal parts.

Further, the shutoff slide is provided with a stationary annular sealing ring or seat 6 and a movable annular sealing ring or seat 7 that can be displaced in the axial direction of gas pipes 4 and 5.

Stationary sealing seat 6 is welded in a gas tight manner on a housing wall 8 and a cylindrical housing part 9 of slide housing 1. Displaceable sealing seat 7 is attached to a further cylindrical housing part 10 by means of an annular, axially flexible member such as accordion-shaped member 11, which is protected from contact with gas flowing through the pipes by a cylindrical protecting jacket 12 which is welded onto movable sealing seat 7 and is thus displaceable jointly therewith in the axial direction of gas pipes 4 and 5. A packing seal 13 is provided between housing part 10 and protecting jacket 12.

Movable sealing seat 7 is urged toward stationary seat 6 by a plurality of springs 14 uniformly distributed about the periphery of seat 7 and by means of bolts or pins 15 which displaceably extend into a flange 16 of movable sealing seat 7.

Further, the shutoff slide valve includes a slide plate 17 including a sealing ring 18 and a shutter element 19. Slide plate 17 is fastened in a supporting frame 20 which is provided on opposite longitudinal slides thereof with guide rollers 21 which run along track rails 22 and 23.

Track rails 22 and 23 are joined to each other at their upper ends by means of a cross beam 24 and rest by means of braces 25 and 26 on a support 27 and brackets 28 and 29.

Figure 2:
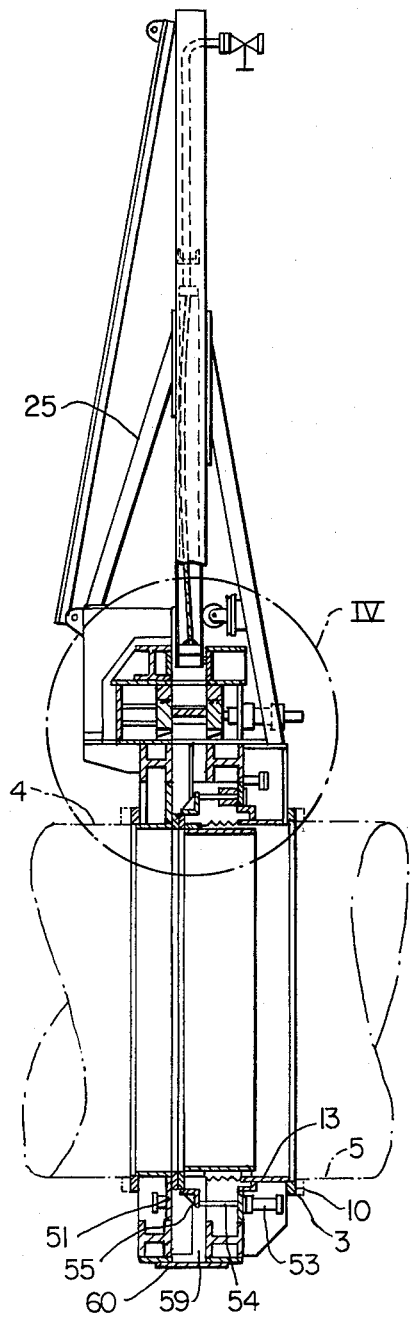
FIG. 2 is a longitudinal section of the shutoff slide valve of FIG. 1, with the slide plate being in the withdrawn or open position.
Figure 3:
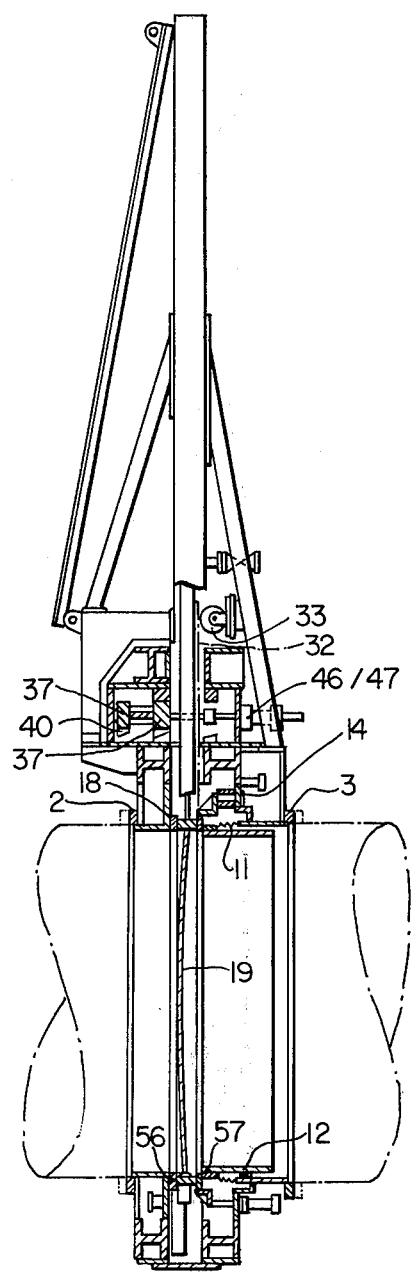
FIG. 3 is a longitudinal section of the shutoff slide valve of FIG. 1, with the slide plate being in the inserted or closed position.

Slide plate 17 and frame 20 can be displaced by means of two chain drives 30 and 31 between an opened position outside slide housing 1, as shown in FIG. 2, and a closed position inside slide housing 1, as shown in FIG. 3. Chain drives 30 and 31 are arranged on the longitudinal sides of supporting frame 20 and consist in each case of a chain 32 attached to the frame 20 and a sprocket wheel 33 engaging the chain. Both sprocket wheels 33 are arranged outside slide housing 1 and can be jointly driven by a driving shaft 34 through a driving unit that is not shown. Chains 32 have such a length that sprocket wheels 33 remain engaged with the respective chains 32, both in the opened position of FIG. 2 and also in the closed position of FIG. 3.

Slide plate 17 can be moved into slide housing 1 through a housing opening 35, that can be closed by a closing element such as closing plate 36. Track rails 22 and 23 are discontinued in the area of housing opening 35.

Closing plate 36 consists of an elongated rectangular sealing frame 37 and a shutter element 38. Sealing frame 37 has two wedge surfaces 39 and 40 on the side thereof facing toward the interior of the gas pipe. The wedge surfaces engage respective complementary wedge surfaces 41 and 42 arranged in slide housing 1.

Guide rollers 43 are arranged laterally on opposite ends of sealing frame 37. Rollers 43 run in track rails 44 and 45 which extend transverse to the plane of slide plate 17, so that closing plate 36 is displaceble perpendicularly to the direction of displacement of slide plate 17.

Closing plate 36 can be displaced by means of two reciprocally-spaced laterally arranged hydraulic cylinders 46 and 47 between a closed position, wherein housing opening 35 is closed (see FIGS. 2 and 4), and an open position, wherein housing opening 35 is opened (see FIG. 3). In the closed position sealing frame 37 will be pressed against a sealing seat 48 of slide housing 1 through the engagement of wedge surfaces 39 and 40 with complementary wedge surfaces 41 and 42, respectively.

Figure 4:
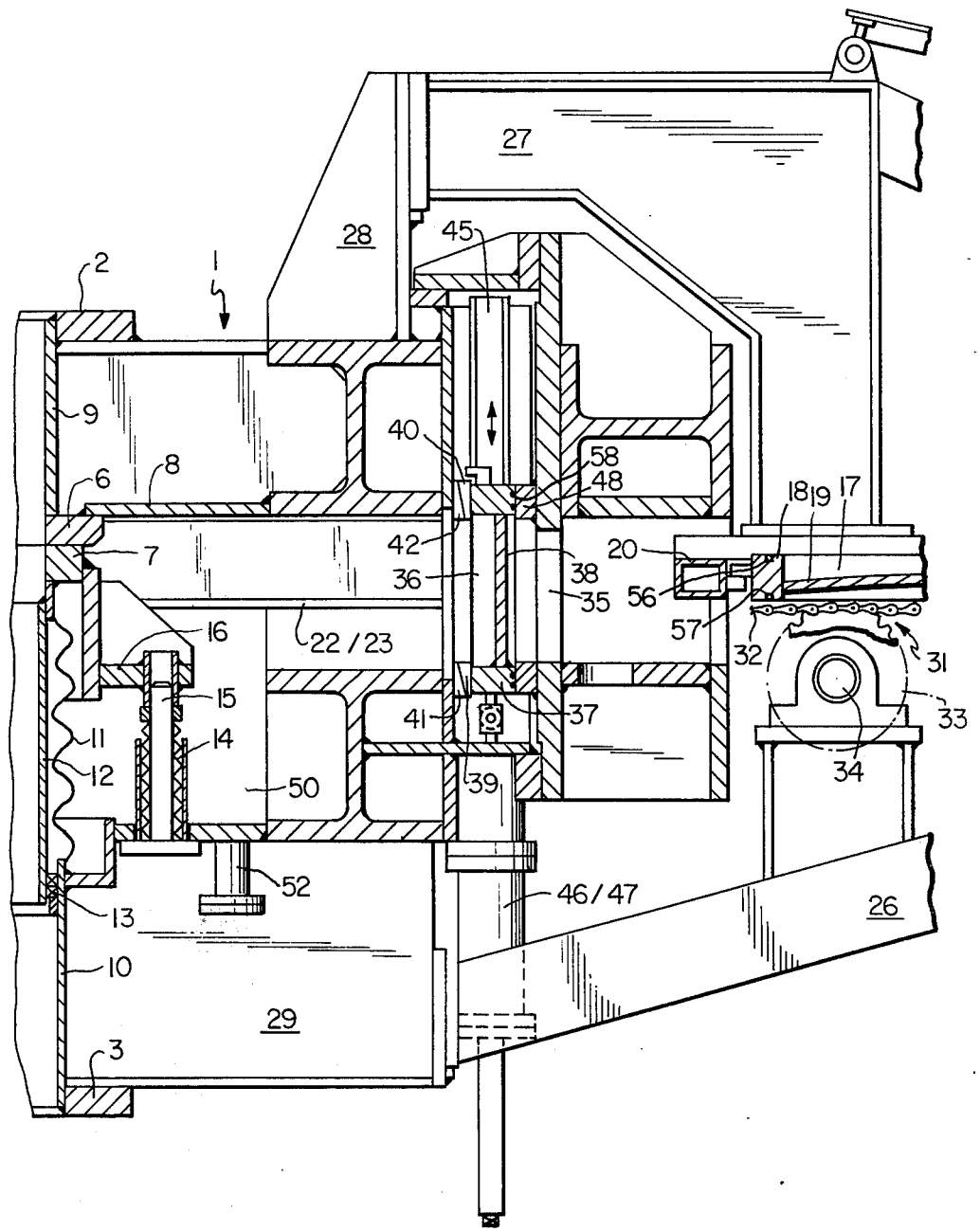
FIG. 4 is an enlarged view, in longitudinal section, of that portion of FIG. 2 denoted by IV, the view however being illustrated as rotated 90° in the clockwise direction.

Sealing seats 6 and 7 define a housing chamber 50, with member 11 in the opened position of FIGS. 2 and 4, or with member 11 and slide plate 17 in the closed position of FIG. 3. Chamber 50 is separated in a gas tight manner from the interior of gas pipes 4 and 5 and can be connected to the atmosphere through housing opening 35.

Further, slide housing 1 has a suction connection 51, or a plurality thereof, through which any gas which may possibly be present in housing chamber 50 can be drawn off by means of a ventilator. Slide housing 1 is also provided with an inlet connection 52, through which an inert gas, e.g. $N_2$, can be introduced into housing chamber 50.

Movable sealing seat 7 can be moved away from stationary sealing seat 6 by means of a plurality of annularly spaced hydraulic cylinders 53 that counteract the pressure of springs 14. Piston rods 54 of cylinders 53 engage extensions 55 of flange 16 attached to sealing seat 7.

Slide plate 17 is provided on opposite axial sides thereof with asbestos packings 56 and 57 inserted into sealing ring 18. Closing plate 36 is provided with a packing 58 on the side thereof which faces sealing seat 48.

In order to adjust and possibly clean slide plate 17, a lower opening 59 is provided in the bottom of slide housing 1, which opening is closed by removable cover plate 60.

In the opened position of the slide, slide plate 17 is situated outside slide housing 1, as shown in FIGS. 1, 2 and 4. Movable sealing seat 7 is urged by springs 14 directly against stationary sealing seat 6.

Housing chamber 50 is closed by closing plate 36. Accordingly, in the case of possible gas leakage through sealing seats 6 and 7, pressure can build up in housing chamber 50. Such pressure, in addition to the pressure of the wedges, urges closing plate 36 against sealing seat 48, thus securing a perfect seal of closing plate 36 between chamber 50 and the atmosphere.

Since the temperatures prevailing on closing plate 36 are substantially lower than those in the interior of the gas pipe, packing 58 may be formed of Viton or neoprene cords, rather than otherwise and heretofore required asbestos packing elements.

On the other hand, the inner sealing surfaces of sealing seats 6 and 7 are protected through the equalization of pressure between the interior of the gas pipe and housing chamber 50, which makes it possible to dispense with the need for asbestos packings on sealing seats 6 and 7 which would otherwise be required due to the high temperatures prevailing at such positions. This feature also makes it possible to eliminate the otherwise required, very difficult and time consuming replacement of sealing seat packings or sealing seats, which would be destroyed by the gases which would otherwise leak through such packings with the velocity of sound.

The desired equalization of pressure between the interior of the gas pipe and housing chamber 50 can also be facilitated by subjecting chamber 50 to an inert gas, e.g. $N_2$, through inlet connection 52, which inert gas is under somewhat higher pressure than the pressure of the gas pipe. This aids in preventing soiling of chamber 50 which may otherwise occur in the course of time.

On the other hand, slide plate 17 which has asbestos packing elements 56 and 57 may be positioned outside slide housing 1. Thus, the slide plate 17 and packings 56 and 57 are freely accessible from either side and can be serviced very easily during the operation of the blast furnace. Further, the risk of the formation of inner deposits of dirt and water, and therewith of operation failure, is much lower than in the case of fully encapsuled shutoff slides.

In order to close gas pipes 4 and 5, closing plate 36 is shifted into its open position by means of hydraulic cylinders 46 and 47, and housing opening 35 is opened. At the same time, movable sealing seat 7 is moved by hydraulic cylinders 53 away from stationary sealing seat 6. Slide plate 17 is then passed by chain drives 30 and 31 through housing opening 35 and inserted between sealing seats 6 and 7 (see FIG. 3). Finally, movable sealing seat 7 is pressed by springs 14 against slide plate 17, thus also causing slide plate 17 to be pressed against stationary sealing seat 6.

Accordingly, in the closed position of the slide, housing chamber 50 is separated from the interior of the gas pipe through a double seal formed by slide plate 17 and sealing seats 6 and 7. However, housing chamber 50 remains in communication with the atmosphere through housing opening 35. This prevents the possibility of buildup of an overpressure in housing chamber 50 in relation to the closed pressureless section of the pipe, and any gas which might possibly leak through the slide plate and the pressure side sealing seat thus cannot flow from housing chamber 50 into the closed pressure-less pipe section.

The slide valve is opened by reversing the above operations, during which movable sealing seat 7 moves a greater distance until it contacts stationary sealing seat 6, to thereby effect sealing of the interior of the gas pipe in relation to housing chamber 50. However, as mentioned above, such sealing need not be perfect, since an equalization of pressure is desired between the interior of the gas pipe and housing chamber 50.

The described shutoff slide valve thus achieves a perfect tightness, both in relation to the atmosphere when in the open position, and also in relation to the pipe section to be shut off when in the closed position. Further, the weight of the slide is considerably less than that of a fully encapsuled insertion disk slide. Yet further, the slide of the invention provides the advantage of a far lower risk of the formation of inner deposits of dirt and water and, therewith, of operational failures, as compared with the fully encapsuled slides. In addition, there is required a smaller number of service platforms for service and maintenance operations. Finally, the slide of the invention also offers a greater degree of safety, since in accordance with accident prevention regulations its housing is open during non-operating periods of the blast furnace.

Of course, it is possible within the scope of the invention to construct closing element 36 in a manner other than that described above, e.g. in the form of a roller constructed similar to a two-way cock, which in the open position of the slide is pressed by the inner pressure of housing chamber 50 to a countersurface corresponding to sealing seat 48.

It would also be possible to provide a closing plate in the form of a double plate, wherein the desired sealing effect may be produced by introducing a pressure medium, e.g. water, $N_2$, etc., between the two plates.

Also the driving means for the movable sealing seat 7 or for slide plate 17 may readily be other than as described above and still be within the scope of the invention. For example, slide plate 17 could be displaced by two upper sprocket wheels that engage open link chains outside the slide housing and transport the slide plate inwardly, at which point the slide plate could be displaced by two further sprocket wheels driven by a transmission chain, until the slide plate reaches abutment in the closed position. Further, displacement could be effected by a hydraulic cylinder attached to cross beam 24.

It will be further apparent that still further modifications to the specifically described structural arrangement may be made without departing from the scope of the invention.

What is claimed is:

1. A slide valve for closing large gas pipes, particularly such pipes carrying dust-containing hot gases, said slide valve comprising:

a housing having an axial passage therethrough connectable to gas pipes, said housing having therein a housing opening;

a stationary sealing seat within said housing;

a movable sealing seat opposed to and axially spaced from said stationary sealing seat within said housing;

a slide plate mounted to be selectively movable from an open position exterior of said housing, through said housing opening to a closed position within said housing between said sealing seats closing said axial passage;

means for urging said movable sealing seat, when said slide plate is in said open position, into contact with said stationary sealing seat, and when said slide plate is in said closed position, into contact with said slide plate;

said slide plate, when in said closed position, being in sealing contact with both said movable sealing seat and said stationary sealing seat;

a closing element on said housing and selectively movable from a first position closing said housing opening when said slide plate is in said open position to a second position opening said housing opening when said slide plate is in said closed position; and a chamber within said housing exterior of said passage, said chamber, when said slide plate is in said closed position, being sealed in a gas tight manner from the gas pipe and being open to the atmosphere through said housing opening such that any leakage from a pressurized section of the gas pipe will be vented to the atmosphere, and said chamber when said slide plate is in said open position, being closed by said closing element and thus forming a back-up seal to any leakage from the gas pipe.

2. A slide valve as claimed in claim 1, further comprising suction connection means in said housing for venting said chamber.

3. A slide valve as claimed in claim 1, further comprising inlet connection means in said housing for supplying a pressure medium to said chamber.

4. A slide valve as claimed in claim 1, wherein said closing element comprises a closing plate guidable in a direction axially parallel to the pipe, and sealing means for sealing said closing plate against said housing when said housing opening is closed.

5. A slide valve as claimed in claim 4, wherein said closing plate has thereon rollers guidable in track rails extending axially parallel to the pipe; and further comprising hydraulic means for moving said closing plate along said track rails.

6. A slide valve as claimed in claim 4, wherein said sealing means comprises wedge surfaces on said closing plate, and in engagement with complementary wedge surfaces on said housing when said closing plate closes said housing opening.

7. A slide valve as claimed in claim 1, further comprising drive means, positioned exteriorly of said housing, for moving said slide plate between said open and closed positions thereof.

* * * * *